Nov. 9, 1943.   R. B. HULL   2,333,863
VOLTAGE CONTROL APPARATUS
Filed March 11, 1941   2 Sheets-Sheet 2
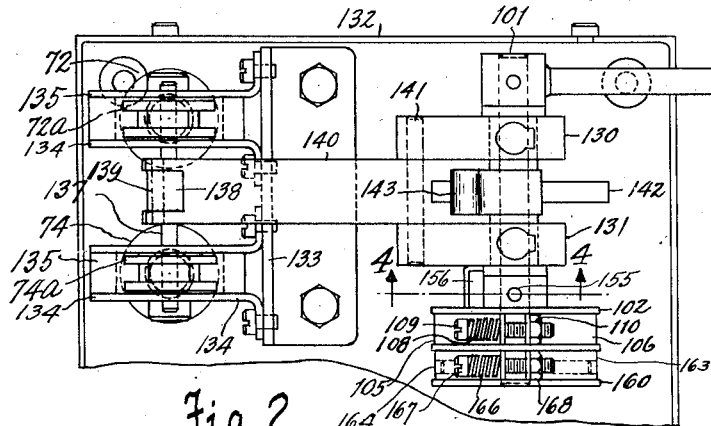
Fig. 2
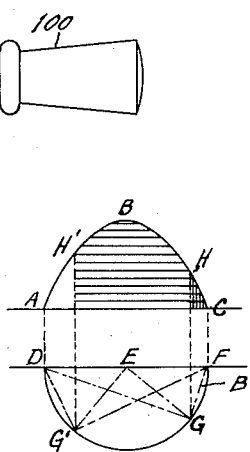
Fig. 8
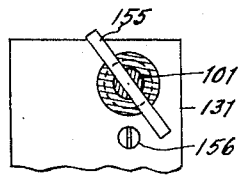
Fig. 4
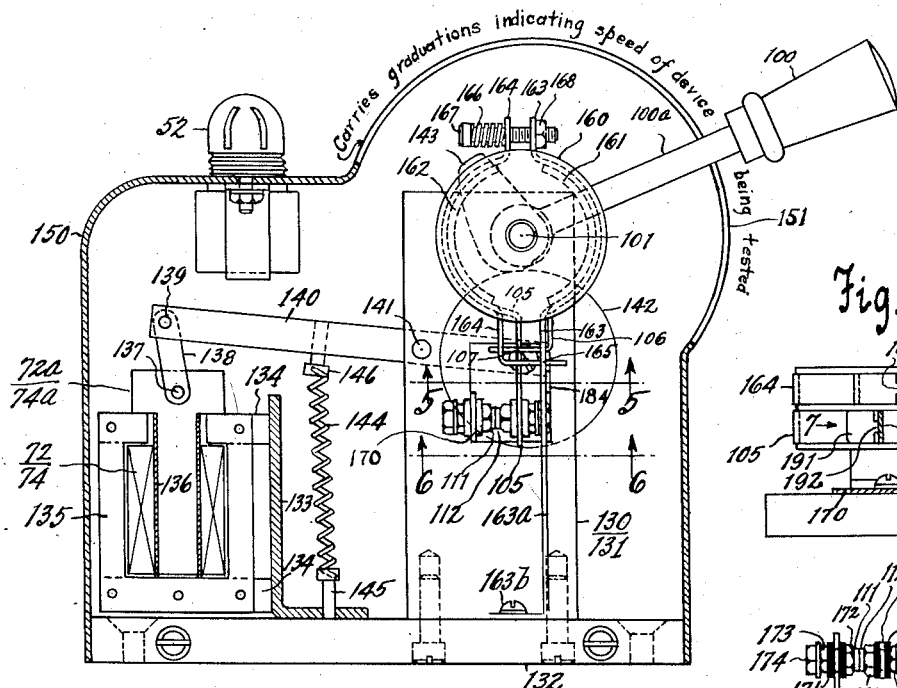
Fig. 3
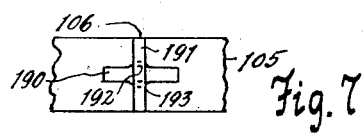
Fig. 7
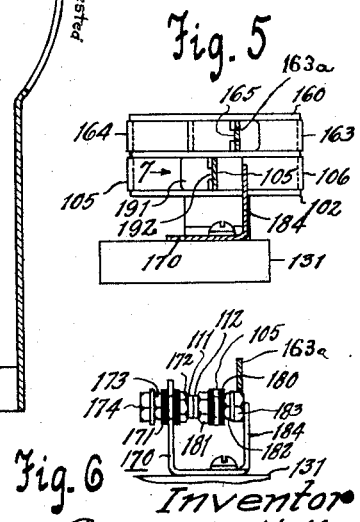
Fig. 5
Fig. 6
Inventor
Raoul B. Hull
by Spencer Hardman & Fehr
his Attorneys Patented Nov. 9, 1943

2,333,863

UNITED STATES PATENT OFFICE 2,333,863

VOLTAGE CONTROL APPARATUS

Raouel B. Hull, Anderson, Ind., assignor to General Motors Corporation, Detroit, Mich., a corporation of Delaware Application March 11, 1941, Serial No. 382,789

2 Claims. (Cl. 172—239)

This invention relates to electrical systems for varying voltage impressed upon an energy translating device, and more particularly to a system which provides an infinitely variable control of D. C. voltage without the use of an instrument such as a rheostat having contacts which are subjected to wear. This is accomplished by controlling a D. C. voltage which is obtained by rectification of an A. C. voltage through the use of rectifier tubes. This invention relates to apparatus for testing the performance of power-driven, energy-translating devices, such as electric generators at various speeds. Heretofore, when testing generators for example, it has been the practice to connect the generator with a D. C. motor and to vary the speed of the motor by means of a rheostat. The number of different speeds at which the generator may be operated is limited by the number of contacts on the rheostat; and the durability of the testing apparatus is limited by the life of the rheostat contacts. When it is considered that a single testing apparatus may be required to test a large quantity of generators during a given period, it is clear that the rheostat will require frequent replacements.

It is therefore an object of the present invention to provide testing apparatus by which the speed of the generator or other device to be tested may be operated at an infinite number of speeds between certain limits, the speed being varied without the use of a rheostat or other speed controlling device having contacts subject to deterioration. It is a further object to simplify the control of the testing apparatus in order to reduce the time consumed by testing. In the disclosed embodiment of the present invention, I provide a constant speed prime mover (preferably an electric motor) connectible with a power shaft (to be coupled with the generator or other device to be tested) by means of an eddy current clutch upon which an infinitely variable voltage (infinitely variable between certain limits) is impressed by adjusting the movable cores of variable inductive reactors included in a voltage controller of the type which controls D. C. voltage obtained by the rectification of an A. C. voltage through the use of rectifier tubes of the thyratron or trigger type.

By means of adjustable reactors an infinitely variable control of the phase relation between the grid voltage and the cathode voltage of the tubes is obtained over a wide range. By varying the phase relation the point in the A. C. wave in the anode circuit at which the tube fires can be varied. Consequently, the D. C. output voltage obtained by rectification of alternating current can be varied over a wide range, the increment of variation being as small or as large as desired.

More specifically, the present invention includes a control monitor having a manually operable handle which, on being moved away from zero speed position, causes the source of variable D. C. voltage to be connected with the eddy current clutch and the voltage applied to the clutch to be increased as the handle is moved away from zero speed position. As the voltage applied to the clutch increases, the speed of the power shaft driven by the prime mover, and hence the speed of the generator being tested, increases. When the control monitor handle is moved in the opposite direction, the voltage of the D. C. source is decreased and the source is disconnected from the clutch and a brake is rendered operative to stop rotation of the power shaft.

Further objects and advantages of the present invention will be apparent from the following description, reference being had to the accompanying drawings wherein a preferred embodiment of the present invention is clearly shown.

In the drawings:

Fig. 2 is a plan view (with the cover removed) of a manually operated control monitor for varying the angle of phase shift between the grid voltage and the cathode voltage of the rectifier tubes.

Fig. 3 is a side view thereof with cover and one of the reactors in section.

Fig. 4 is a sectional view on line 4—4 of Fig. 2.

Figure 1:
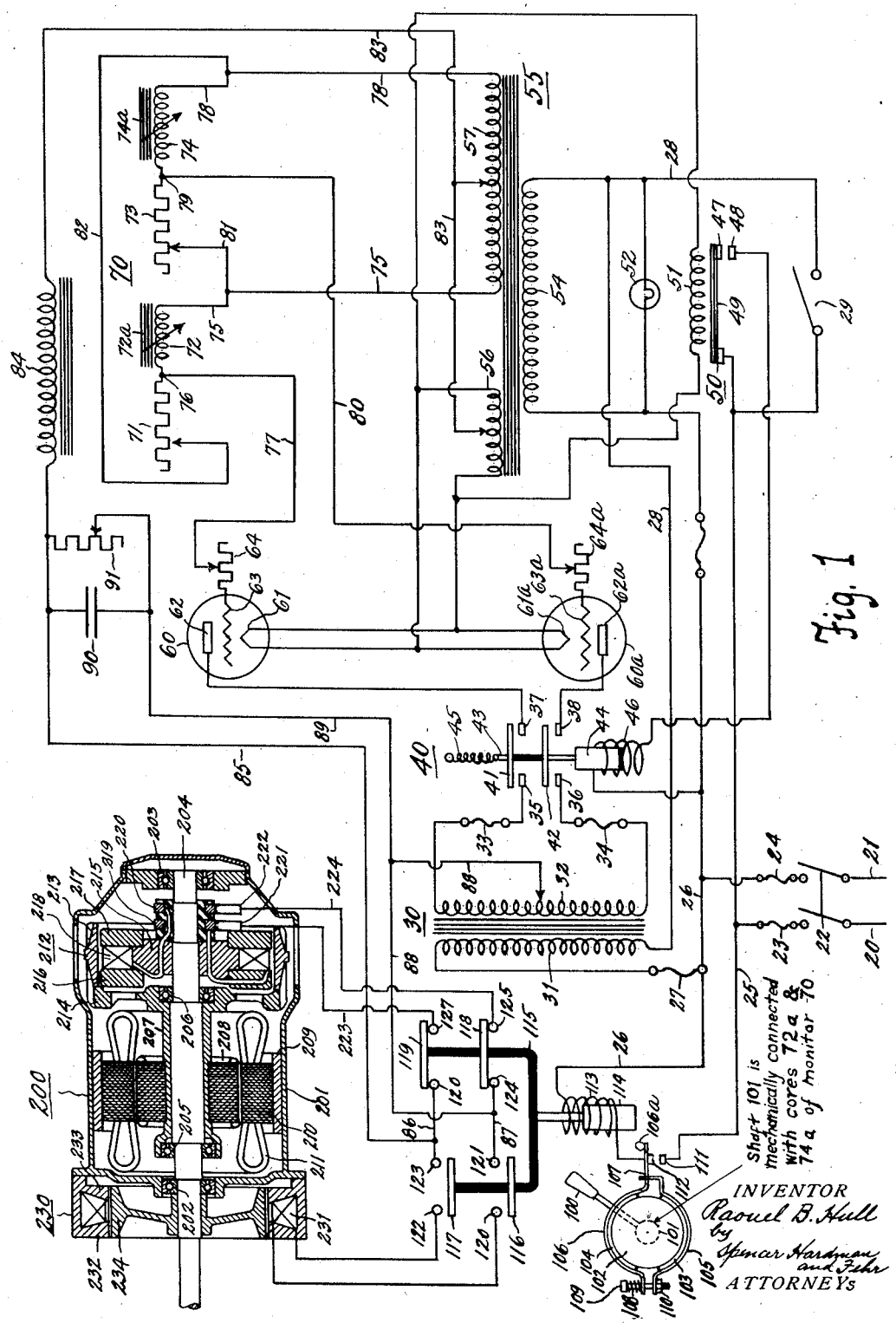
Fig. 1 is a wiring diagram of an embodiment of the present invention.

Figs. 5 and 6 are sectional views respectively on lines 5—5 and 6—6 of Fig. 3.

Fig. 7 is a fragmentary view showing the manner of hinging certain parts of the brake of the control monitor.

Fig. 8 is a diagram showing the manner in which the control monitor varies the phase angle between the grid voltage and cathode voltage.

Referring to Fig. 1 line wires 20 and 21 from an A. C. source at 220 volts and 60 cycles are connected by switch 22 and fuses 23 and 24 with wires 25 and 26. Fuse 27 connects wire 26 with primary 31 of transformer 30 which is the main power transformer for supplying anode current to two grid controlled rectifier tubes 60 and 60a for full-wave rectification. Primary 31 is connected by wire 28 and switch 29 with wire 25. The ends of transformer secondary 32 are connected by fuses 33 and 34 with contacts 35 and 36 respectively of a relay 40 having movable contacts 41 and 42 for connecting contacts 35 and 36 respectively with other stationary contacts 37 and 38 connected, respectively, with anodes 62 and 62a of tubes 60 and 60a. Movable contacts 41 and 42 are insulated from each other and are connected by a rod 43 with an armature 44 normally maintained in upper position by a spring 45 and attracted downwardly by a coil 46 connected with wire 26 with the contact 48 of a thermal switch 50 having a bimetal blade 49 carrying a contact 47 connected with wire 25 and having a heater coil 51 connected with secondary 56 of a transformer 55. The thermal switch 50 is so constructed that, when the instrument is at room temperature, the contacts 47 and 48 will engage in about one minute after the switch 29 is closed. As will be apparent later the purpose of this is to permit the rectifier tubes 60 and 60a to be heated before becoming connected with secondary 32 of transformer 30. Tubes 60 and 60a are preferably type FG-17 thyratron tubes.

The closing of switch 29, indicated by the burning of pilot lamp 52, connects wires 25 and 26 with primary coil 54 of auxiliary transformer 55 having secondary coils 56 and 57. The function of secondary 56 is to supply the necessary power to the cathodes or heaters 61 and 61a of the rectifier tubes 60 and 60a having grids 63 and 63a connected respectively with variable resistances 64 and 64a each having 10,000 ohms of resistance.

The function of secondary 57 of transformer 55 is to supply power to the phase shifting circuits comprising the apparatus 70 hereinafter called the "control monitor." Its function is to vary the phase relation of the grid voltage with respect to cathode voltage within certain limits. Since the phase-shifting method of grid control is used, an excess of voltage may be applied to the monitor 70. Monitor 70 comprises two variable inductive reactors 72 and 74 of the movable core type and two variable resistances or rheostats 71 and 73 connected in bridge to the secondary 57 of the phase shifting voltage transformer 55. The resistors 71 and 73 have a resistance of 5,000 ohms at 70 milliamperes. By means of resistors 71 and 73 the limits of the angle of phase shift of grid voltage with respect to cathode voltage are set, thus determining the range within which lies the point in the A. C. wave in the anode circuit at which the tube fires; and at the same time balancing the anode current through the tubes. The reactors 72 and 74 each have a resistance of 2,400 ohms. Wire 75 connects an end of transformer secondary 57 with reactor coil 72 having a connection at 76 with resistor 71 and with a wire 77 leading to resistance 64 and grid 63. Wire 78 connects an end of transformer secondary 57 with reactor coil 74 having a connection at 79 with resistor 73 and connected by wire 80 with resistance 64a and grid 63a. Wire 81 connects wire 75 with resistor 73. Wire 82 connects wire 78 with resistor 71.

One side of the rectified D. C. line includes wire 83 connected with the center taps of the transformer secondaries 56 and 57, a swinging choke 84, wire 85, wire 86 and contacts 123 and 120. The other side of the rectified D. C. line includes contacts 121 and 124, wire 87 and wire 88 connected with the center tap of secondary 32 of transformer 30. Wire 89 connects wire 88 with a four microfarad filter condenser 90 connected across the D. C. output wires 86 and 87. Condenser 90 reduces the ripple and raises the output voltage. Variable resistor 91, which is a 600 ohm, 500 milliampere, bleeder resistor connected in parallel with condenser 90, operates to absorb any high inverse voltage surges from any highly inductive power device which may be connected with wires 86 and 87. The function of the swinging choke 84 is to protect the rectifier tubes since the peak charging current of the condenser 90 will reach a value in excess of the rated capacity of the tubes.

By changing the inductive reactance in the bridge circuits which is accomplished by moving the cores 72a and 74a in or out of the reactor coils 72 and 74, a variation of the phase relation of the grid voltage with respect to cathode voltage is obtained over a wide range thus providing an accurate control over the output of the rectifier tubes from zero load to full load depending on the limits set by the resistances 71 and 73. In the diagram Fig. 8, distance horizontally on the line A. C. represents time and the distances vertically represent voltage. The curve ABC represents one-half of a full wave of alternating current, the distance AC being 180° or the time of one-half cycle of alternating current. The distance from the curve ABC to the base line AC represents instantaneous A. C. voltage applied to the tubes. The line DEF represents, vectorially, an angle of 180°. EG or EG' represents grid voltage. When the reactor cores 72a and 74a are located so as to occupy all of the central portion within the reactor coils 72 and 74, the grid voltage line EG will coincide with line EF denoting that grid voltage is at 180° phase displacement with respect to the alternating current voltage represented by ABC. At C, this voltage is zero; therefore no output current will be passed by the tubes 60 and 60a. When the reactor cores 72a and 74a are pulled part-way out, the grid voltage changes phase from DEF or 180° to angle DEG. GF represents voltage impressed on the reactors 72 and 74; and DG represents voltage impressed upon the resistors 71 and 73. This means that the tubes 60 and 60a will begin to pass current at point H on alternating current voltage wave ABC. The shaded portion under the line HC represents the output from the tubes 60 and 60a. When the reactor cores 72a and 74a have been nearly withdrawn from the reactor coils 72 and 74 the phase relation between grid voltage and cathode voltage changes to the angle DEG'. G'F is the reactor voltage and G'D is the resistor voltage. This means that the tubes 60 and 60a begin to pass current at point H' on the alternating current voltage curve ABC. The shaded portion beneath the line H'BC represents the output of the tubes. It is therefore apparent that the withdrawal of the cores from the reactors changes conditions from one wherein the tubes do not pass current at any time during the alternating current wave to a condition wherein the tubes pass current at all times during the wave. Consequently, the rectified output voltage is increased from zero to the maximum during the withdrawal of the reactor cores and is reduced as the cores are moved back into the reactor coils.

On the left hand side of Fig. 1, is shown a lever 100 for turning a shaft 101 carrying a brake drum 102 engaged by brake lining members 103 and 104 attached, respectively, to brake bands 105 and 106 which are hingedly connected at 107 and are urged toward the drum by a spring 108 surrounding a screw 109 passing through the bands 105 and 106 and engaging a nut 110. Band 106 carries a contact 112 for engaging a contact 111 connected with the wire 25. When the handle 100 is rotated clockwise, the contact 112 will engage the contact 111 in order to connect a magnet coil 113 with wires 25 and 26. The coil 113 will be energized and will attract upwardly a solenoid armature 114 insulatingly connected by a frame 115 with contacts 116, 117, 118 and 119. Contact 116 is normally out of engagement with contacts 120 and 121. Contact 117 is normally out of engagement with contacts 122 and 123. Contact 118 normally engages contacts 124 and 125. Contact 119 normally engages contacts 126 and 127.

The mechanical connections (not shown in Fig. 1) between the handle 100 and the reactor cores 72a and 74a will be explained in detail later in connection with the description of Figs. 2 to 6. For the present, it is sufficient to state that when the handle 100 is moved counterclockwise, the cores 72a and 74a are being withdrawn from the coils 72 and 74; and, conversely, when the handle 100 is moved clockwise, the cores are being moved into the coils. Therefore, when the handle 100 is moved counterclockwise, the output voltage increases; and, when the handle is moved clockwise, the output voltage decreases. So long as the handle 100 is being moved counterclockwise the switch contacts 111 and 112 are separated; therefore, magnet coil 113 remains deenergized and the switch contacts 118 and 119 are in engagement with stationary contacts as shown.

One of the uses of this control of the voltage of unidirectional current is to control the speed of a shaft connected by an eddy current clutch with the squirrel cage rotor of an A. C. motor, such as the motor 200 shown diagrammatically in Fig. 1. The frame 201 of motor 200 supports bearings 202 and 203 for a shaft 204. The shaft 204 supports bearings 205 and 206 for a hollow shaft or quill 207 carrying a squirrel cage rotor 208 revolving within a stator 209 comprising a stator core 210 and windings 211. This A. C. motor operates the quill 207 at a constant speed. The shaft 204 is driven by the motor at a variable speed depending upon the excitation of an eddy current clutch 212 which comprises a drum or cylindrical shell 213 of special iron alloy attached to a spider 214 driven by quill 207. Inside of the drum 213 is a magnetic field spider 215 attached to shaft 204 and having north and south poles 216 and 217 energized by an annular coil 218 having its terminal leads attached to slip rings 219 and 220 engaged by brushes 221 and 222 connected by wires 223 and 224 with switch contacts 127 and 125. As the voltage impressed upon the clutch coil 218 increases, the torque delivered by the clutch from the rotor quill 207 to the shaft 204 increases. Where the shaft 204 is driving a machine, such as a D. C. generator on test, the speed of the shaft 204 increases as the voltage impressed upon the clutch coil 218 increases.

One of the uses of the motor 200 is for testing electric generators, for example, direct current generators for use on automotive vehicles. An automobile generator is driven by the propelling engine and operates to charge a storage battery and to furnish current for lighting and ignition and other automobile accessories. The generator is connected with the battery through a reverse current relay. One of the tests performed on an automobile generator during its final inspection is to determine at what generator speed it will generate a voltage sufficient to cause the reverse current relay to close and the charging of the battery to begin. Since the automobile generator is driven at variable speed, it is provided with some means of regulation. This may be inherent regulation such as provided by a third brush or other regulation as provided by a current regulator, a voltage regulator or a combination of both. Therefore, another test to be performed on the generator is to determine its output at various speeds, particularly at the highest speed. After these tests have been performed, it is advantageous to bring the generator quickly to rest so that it may be then uncoupled from the shaft 204 and replaced by another generator to be tested. Therefore, it is desirable to bring the motor 200 quickly to rest. By turning the handle 100 clockwise not only will the voltage impressed upon the clutch coil 218 diminish but the contacts 111 and 112 will close, thereby energizing the coil 113 which will attract the armature 114 upwardly thereby causing contacts 118 and 119 to move to open position and contacts 116 and 117 to be moved to closed position. This causes the clutch coil 218 to be disconnected from the power source and the exciting coil 231 of a magnetic brake 230 to be connected with the power source. The brake 230 comprises a structure providing north and south poles 232 and 233 acting upon a drum 234 of special alloy iron attached to the shaft 204. This motor 200 with its eddy current clutch and eddy current brake, is not per se a part of the present invention, but is disclosed for purposes of illustrating one of the uses of the present invention. The particular motor illustrated is one which is manufactured by the Louis Allis Company of Milwaukee, Wisconsin.

The construction of the control monitor will now be described in detail with reference to Figs. 3 to 6. The shaft which supports the handle 100 is rotatably supported by plates 130 and 131 attached to a base plate 132. Plate 132 supports a bracket 133 which supports pairs of angle bars 134. Each pair of angle bars 134 supports an external magnetizable core 135 of the reactors 72 and 74. Within each external core 135 is located a reactor coil 72 or 74 surrounding a non-magnetizable tube 136. Each tube receives an adjustable core 72a or 74a. As shown in Fig. 2 the cores 72a and 74a are connected by a cross pin 137 which is connected by links 138 and a pin 139 with a lever 140 pivoted upon a rod 141 supported by the plates 130 and 131. The right end of lever 140 pivotally supports a roller 142 for engaging a cam 143 attached to shaft 101. The roller 142 is urged toward the cam 143 and the cores 72a and 74a are urged downwardly by a spring 144 attached at its lower end to a screw 145 fixed to the base 132 and attached at its upper end to a screw 146 fixed to the lever 140. The cam 143 is so shaped as to increase the sensitivity of the control monitor as the handle 100 is moved counterclockwise from zero speed position. During the first part of the movement of handle 100 counterclockwise from zero speed position the speed increase is relatively slight. This is desirable since it must be known with accuracy at what speed the generator voltage is such that the reverse current relay will close so that charging of the battery will begin. During the latter half of th emovement of lever 100 in a counterclockwise direction, the speed increases rapidly, so that a relatively short movement of the lever 100 brings the generator on test to maximum speed.

The apparatus is housed by a case or cover 150 attached to the base. This case is provided with a slot 151 through which the handle 100a extends.

A portion of the case adjacent the slot 151 may be provided with a scale of graduation showing the different speeds of the generator being tested corresponding to positions of the handle. The movement of the handle 100 is limited by providing the shaft 101 with a cross pin 155 (Fig. 4) the ends of which may strike a stop pin 156 attached to the plate 131.

The handle 100 is frictionally held in any position in which it may be set. For this purpose the shaft 101 drives a brake disc 160 engaged by brake shoes 161 and 162 attached to brake bands 163 and 164 which are hingedly connected at 165 and which are urged towards each other by a spring 166 surrounding a screw 167 passing through ends of the bands 163 and 164 and threadedly engaging a nut 168. The band 163 has a straight extension 163a attached by a screw 163b to base 132. The brake drum 160 is integral with the brake drum 102, shown diagrammatically in Fig. 1.

As shown in Fig. 6, the plate 131 supports a bracket 170 carrying a nonconducting bushing 171 supporting a screw 172 carrying the contact 111. The screw receives a nut 173 for attaching the screw 172 to the bushing 171. The screw also receives a nut 174 for securing a wire (not shown) to the screw 172. The brake band 105 shown in section in Fig. 6 supports a nonconducting bushing 180 through which extends a screw 181 carrying the contact 112. Screw 181 receives a nut 182 for securing the screw to the band 105. Screw 181 receives a nut 183 for attaching a wire (not shown) to the screw 181. Bracket 170 provides a stop member 184 located in the path of movement of the brake band 105, thereby limiting the extent of separation of the contacts 112 and 111 when the handle 100 is moved counterclockwise in Figs. 1 and 3. The manner of hingedly connecting the parts of each pair of brake bands will now be described with reference to Fig. 7, which is drawn double the scale of Figs. 5 and 6. One of the brake bands such as 105, is provided with a slot 190 and the other brake band member, such as 106, is provided with a head 191 separated by a narrow neck 192 from the remainder of the band. Slot 190 is slightly longer than the width of the head 191 so that the head may be passed through the slot when the head is 90° from the position shown in Fig. 7. The neck 192, which is slightly greater in width than the thickness of the band member 106, is received by the intermediate enlarged portion 193 of the slot 190 when the member 106 is turned into the position shown in Fig. 7, after its head 191 has been passed through the slot 190. The band members 163 and 164 are hingedly connected in a similar fashion.

When the handle 100 is moved clockwise, contacts 112 and 111 are closed to cause relay coil 113 to be energized thereby causing movable contacts 118 and 119 to be separated from their stationary contacts and movable contacts 116 and 117 to engage their stationary contacts. This results in disconnection of eddy current clutch coil 218 from the power source, and in the connection of the power source to the eddy current brake coil 231. In using the apparatus to test an automobile generator, the handle 100 of the control monitor is moved counterclockwise to a position which causes the generator to be driven at its "cut-in" speed, meaning the speed at which the generator begins to charge a storage battery. The speed is read from a tachometer connected with the motor shaft 204 or with the generator shaft. The current output is read from an ampere meter connected between the generator and the battery. The handle 100 is moved successively into positions such as to cause the generator speeds to increase to such values that the ampere meter will read successively 7, 10, and 15 amperes, for example; and the corresponding speeds are noted. Finally the handle 100 is moved to such position that the generator output has attained its maximum, and the speed at which the generator begins to develop the maximum amperage is noted. If the test is completed, the handle 100 is moved backward only sufficiently to cause contacts 111 and 112 to close, whereupon the brake acts promptly to reduce the generator speed to zero. The tester's time is saved by reducing the time for bringing the generator to rest so that another generator to be tested may be substituted for the one which has been tested. If it is desired to repeat any part or all of the test, it is not necessary to reduce the generator speed to zero before starting the test again. In such case, the handle 100 is moved quickly to initial position so that the effect of the brake is minimized while contacts 111 and 112 are closed. The repeating of any part of the test may be started while the generator shaft is still rotating. This saves the tester's time by not requiring that the generator be brought to rest before the test is repeated.

The base 132 may support the adjustable resistors 71 and 73 in any suitable manner, not shown. The cover or case 150 supports the indicator lamp 152 as shown in Fig. 3, and may also support the switch 29.

The advantages of the present system of speed control over the conventional control by a rheostat include flexibility and durability. Greater flexibility is present because the control by rheostat is limited to the number of taps which the rheostat provides, whereas the positions of the reactor cores are unlimited. Greater durability is present because there are no wiping contacts to wear out as in case of a rheostat.

While the embodiment of the present invention as herein disclosed, constitutes a preferred form, it is to be understood that other forms might be adopted, all coming within the scope of the claims which follow.

What is claimed is as follows:

1. Apparatus for testing a power-driven energy-translating device having a drive shaft comprising, in combination, a power-operated shaft, a magnetic clutch having a winding and operable for variably transmitting torque from the power-operated shaft to the shaft of the device being tested, said torque depending upon the voltage impressed upon the winding of the clutch, a magnetic brake having a winding and operable to stop rotation of the drive-shaft, the effectiveness of the brake depending on the voltage impressed upon its winding, means for providing a variable voltage and having a mechanically movable member, the position of which determines the voltage of said means, a switch which normally connects the clutch winding with the voltage means and normally disconnects the brake winding from the voltage means and which is operable to cause the clutch winding to be disconnected from the voltage means and the brake winding to be connected with the voltage means, and a controller having a movable operating handle and means operated thereby for actuating said member of the voltage means and having means responsive to any substantial movement of the handle in the direction for decreasing the voltage for causing the switch to disconnect the clutch winding from the voltage means and to connect the brake winding with the voltage means and responsive to any substantial movement of the handle in the direction for increasing the voltage for allowing the switch to return to normal status, rapid return movement of the handle to minimum voltage position minimizing the effect of the brake to permit repetition of the test while the drive shaft of the energy-translating device is still rotating.

2. Apparatus for testing a power-driven energy-translating device having a drive shaft comprising, in combination, a power-operated shaft, a magnetic clutch having a winding and operable for variably transmitting torque from the power-operated shaft to the shaft of the device being tested, said torque depending on the voltage impressed upon the winding of the clutch, a magnetic brake having a winding and operable to stop rotation of the drive shaft, the effectiveness of the brake depending on the voltage impressed upon its winding, means for providing a variable voltage and having a mechanically movable member the position of which determines the voltage of said means, a switch which normally connects the clutch winding with the voltage means and normally disconnects the brake winding from the voltage means and which is operable to cause the clutch winding to be disconnetced from the voltage means and the brake winding to be connected with the voltage means and a controller having a movable operating handle and a shaft rotated by the handle, means operated by the shaft for actuating the said member of the voltage means, a switch actuator rotatably supported and frictionally connected with the shaft, stops restricting movement of the switch actuator in either direction, a pair of switch contacts engaged by movement of the switch actuator resulting from any substantial movement of the handle in the direction for decreasing the voltage and disengaged by movement of the switch actuator resulting from any substantial movement of the handle in the direction for increasing the voltage, and an electro-magnet which is energized in response to the closing of said pair of switch contacts to operate the first mentioned switch for disconnecting the clutch winding and for connecting the brake winding with the voltage means, rapid return movement of the handle to minimum voltage position minimizing the effect of the brake to permit repetition of the test while the drive-shaft of the energy-translating device is still rotating.

RAOUEL B. HULL.